United States Patent

[11] 3,576,250

| [72] | Inventor | Leon L. Aitken<br>La Mirada, Calif. |
|---|---|---|
| [21] | Appl. No. | 864,763 |
| [22] | Filed | Oct. 8, 1969 |
| [45] | Patented | Apr. 27, 1971 |
| [73] | Assignee | Western Gear Corporation<br>Lynwood, Calif. |

[54] CENTRIFUGALLY CONTROLLED POWER ROLLER FOR CONVEYOR SYSTEM
8 Claims, 8 Drawing Figs.

| [52] | U.S. Cl. | 198/127 |
|---|---|---|
| [51] | Int. Cl. | B65g 13/02 |
| [50] | Field of Search | 214/84;<br>198/127, 160 |

[56] References Cited
UNITED STATES PATENTS

| 2,453,401 | 11/1948 | Beeching | 198/127 |
|---|---|---|---|
| 3,034,637 | 5/1962 | Swezey et al. | 198/160 |

Primary Examiner—Gerald M. Forlenza
Assistant Examiner—John Mannix
Attorney—Huebner & Worrel

ABSTRACT: Power roller system for moving cargo over a supporting surface which includes a flyweight control for raising the roller from a nontraction lowered position to a traction upper position, the flyweight being driven by the prime mover which drives the roller, and acting through thrust members and linkages to raise or lower the power roller.

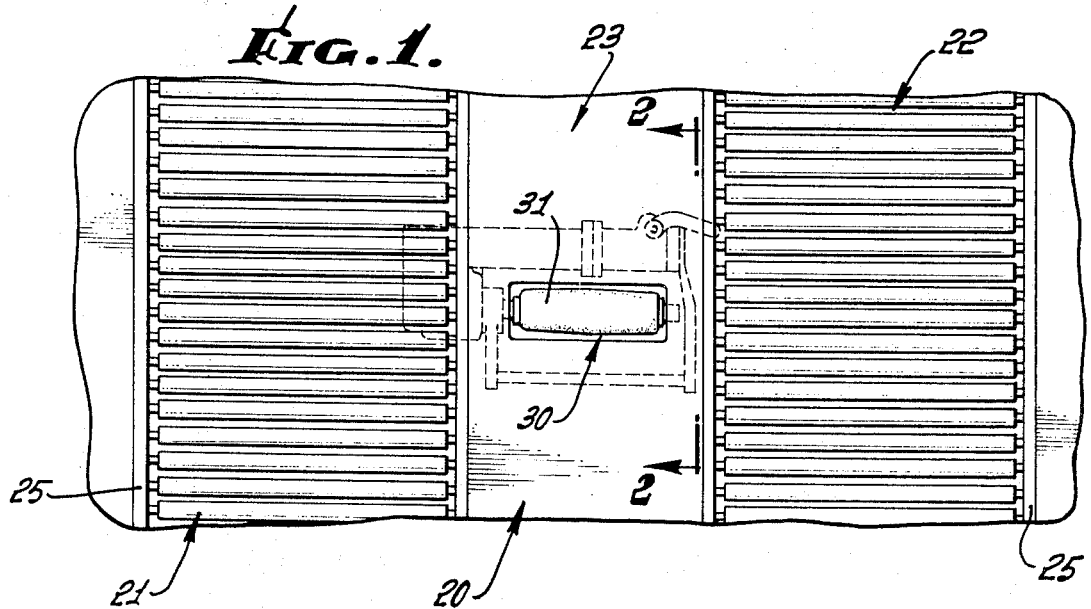
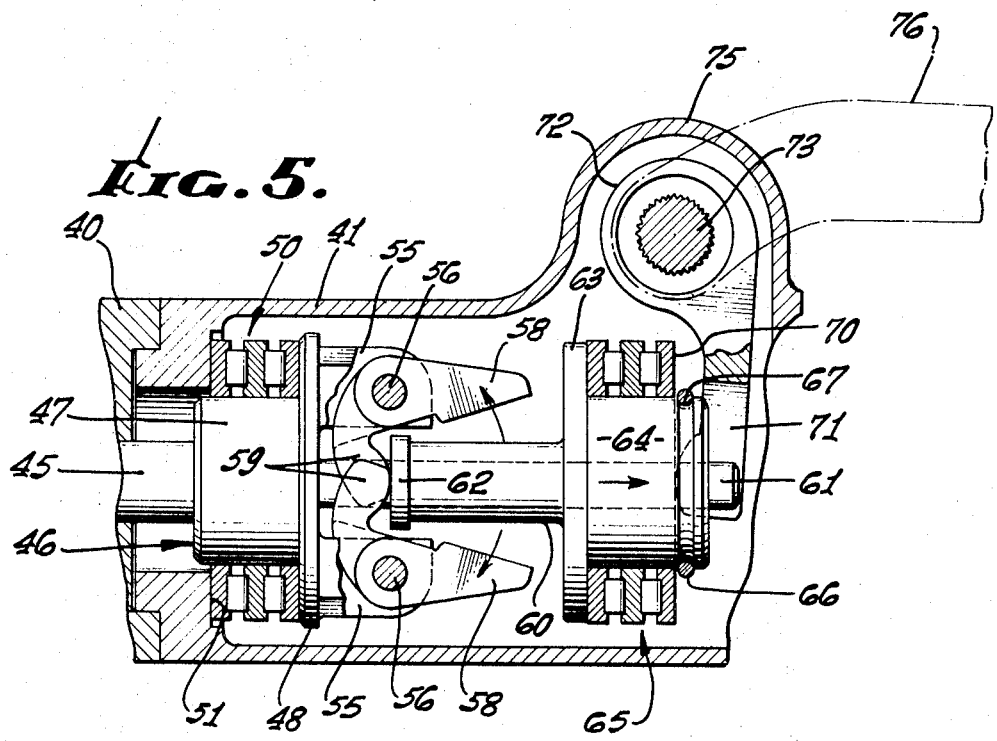

INVENTOR.
LEON L. AITKEN
By
Huebner & Worrel
ATTORNEYS.

INVENTOR.
LEON L. AITKEN

INVENTOR.
LEON L. AITKEN
BY
Huebner & Worrel
ATTORNEYS.

CENTRIFUGALLY CONTROLLED POWER ROLLER FOR CONVEYOR SYSTEM

BACKGROUND OF THE INVENTION

In transferring cargo from a platform into or out of aircraft, or moving it at terminals or in warehouses, various forms of or mobile support are known. The cargo may consist of cargo or baggage containers or other objects with a generally flat bottom. The supports may be idle rollers, casters, balls, or air lifts, which sustain the weight of the cargo in a manner to provide convenient travel when sufficient force is applied to the cargo.

Power driven rollers having traction with the bottom of the cargo may supply the propelling force. Such rollers should be adapted for movement into or out of traction engagement with the cargo.

SUMMARY OF THE INVENTION

The principal object of the present invention is to provide a novel mechanism for shifting a power driven roller from a lower nontraction position to an elevated position for traction with the cargo.

This is accomplished by utilizing the electric motor which drives the roller to rotate a flyweight. When the motor is off, the flyweight remains in a nonoperative condition. Upon rotation, the weights move outwardly. In doing so they turn arms which bear against a sleeve and advance the latter against a rocker lever. Action of the rocker lever is translated through a linkage system to one end of a roller frame, the frame being pivotally secured at its opposite end to a fixed base. Thus the force generated by rotation of the flyweight will elevate the roller.

The apparatus is designed so that the force elevating the roller is sufficient to bring it into suitable traction with the bottom of the cargo. The rotational speed of the flyweight is directly responsive to the r.p.m. of the motor.

If the cargo should happen to be progressing down a slight incline, due to difference in height of locations, and consequently tend to overrun the roller, the motor speed will increase, with the result that the flyweight action will maintain the roller in contact with the cargo, and acting as a brake to govern the rate of travel of the cargo.

BRIEF DESCRIPTION OF THE DRAWINGS

FIG. 1 is a top plan view of a conveyor system with the power roller assembly mounted in conjunction therewith;

FIG. 5 is a fragmentary enlarged vertical section of the flyweight housing, illustrating the flyweight mechanism in operating position;

DESCRIPTION OF THE PREFERRED EMBODIMENT

Figure 2:
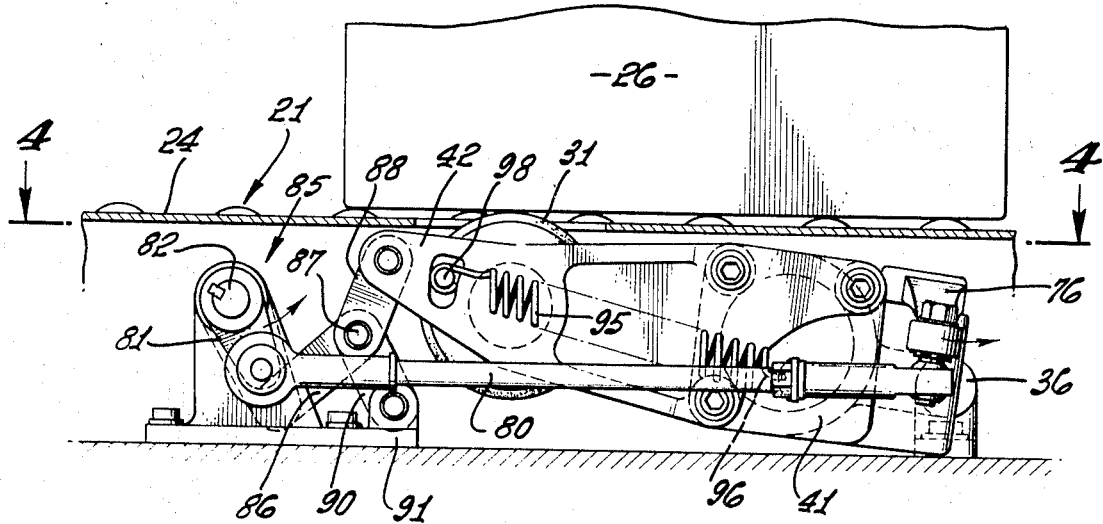
FIG. 2 is a vertical section, enlarged, taken on the line 2-2 of FIG. 1 illustrating the power roller in its upper, traction, position.

The environment of the device is illustrated in FIG. 1 in which is shown a transfer platform 20 comprising parallel systems 21 and 22 with an aisle 23 therebetween. The aisle is provided by a horizontal fixed platform 24, and by reference to FIGS. 1, 2 and 3 it will be noted that the rollers are mounted for free rotation in a horizontal structure 25 with the upper peripheries of the rollers extending slightly above the latter structure. A fragmentary portion of a load, such as a cargo container 26, is shown resting upon the rollers.

Applicant's power roller assembly 30 is securely mounted on the platform 24 in position so that roller 31 is disposed entirely in the aisle 23 with its axis parallel to the axes of the conveyor rollers 25.

The power roller, sometimes termed "drive roller" 31 is driven by an electric motor or other suitable type of motor 32 at slow speed, through a reduction gearbox 33.

Figure 3:
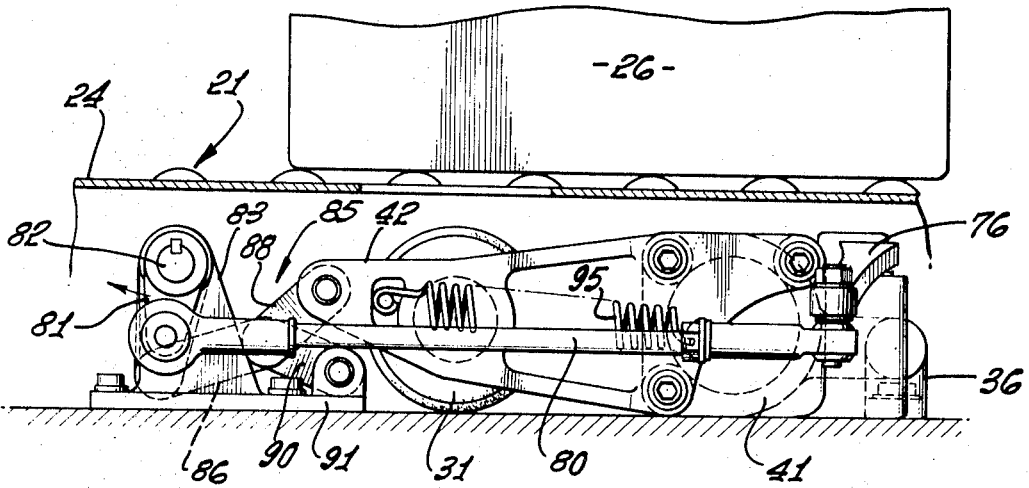
FIG. 3 is a view similar to FIG. 2 with the roller lowered out of its operative position.

It is desirable that the drive roller be elevated into traction engagement with the bottom of the load 26, as shown in FIG. 2, when the motor 32 is operating, and that the drive roller be lowered out of contact with the load when the motor is not operating.

This is accomplished by structure and mechanism next described.

A base member 35 is securely bolted or otherwise fixedly mounted upon the platform 24. This base member includes upstanding ears 36 at each end providing mountings for pivot pins 37 on which are pivotally mounted lugs 38. These lugs 38 are extensions of a rigid structure which mounts the drive roller 31, and includes the housing of the motor 32, the gearbox 33, a shaft housing 40, a flyweight housing 41 and a frame extension 42.

The assembly described is thus pivotally supported on the axis of the pivot pins 37 laterally remote from the drive roller 31 so that the assembly carrying the drive roller can be shifted up or down as may be required for the purposes previously indicated.

The mechanism for accomplishing this will next be described. An extension 45 of the main shaft of the motor which passes through the housing 40, having any suitable bearings in the latter, is keyed to a flyweight yoke 46. This results in the flyweight yoke being rotated at the same high speed as the motor. A higher speed may be achieved by conventional transmission means. The flyweight yoke includes an annular section 47 and a flange 48. A thrust bearing assembly 50 is disposed between the flange 48 and an annular shoulder 51 formed on the interior of the flyweight housing 41. Extending from the flange 48 are mounting posts 55 carrying pivot pins 56. The posts are so positioned that the axes of the pivot pins are parallel. On these pivot pins are mounted flyweights 58 in general planes parallel but diametrically separated with respect to the axis of the flyweight member 48. The flyweights include arms 59.

A sleeve 60 is coaxially supported on a reduced section 61 of the motor shaft extension 45 for relative reciprocal movement on said shaft. This sleeve 60 at one end is provided with a flange 62, and at the opposite end is fixed to a plate 63. From the plate extends a collar 64, surrounding which is a thrust bearing assembly 65. The latter is retained against the plate 63 by a retaining ring 66 secured in a groove 67 at the end of the collar 64.

The sleeve is free on shaft extension 61, to rotate and move longitudinally along its axis.

Against the end face 70 of the thrust bearing assembly 65 bears a bifurcated rocker lever 71. This lever has a central arm 72 which is splined on a rocker shaft 73. The latter is mounted by suitable bearings 74 in a housing extension 75, the rocker shaft projecting through the housing for keyed connection with a lever 76.

From the foregoing it should be apparent that suitably rapid rotation of the flyweight yoke will swing the flyweights on the pivot pins 56 and cause arms 59 on the flyweights to impose axial force against the flange 62. This in turn will move the sleeve 60 and the rocker lever 71, consequently imparting limited rotation to the rocker shaft 73 and the lever 76. How this is utilized will next be described.

The lever 76 is connected to a rod 80 which is adjustable in length (utilizing a turnbuckle principle) the rod at its other end being coupled to a rocker arm 81. The latter is keyed to a shaft 82 which is journaled near its ends in standards 83 spaced apart slightly more than the length of the drive roller.

Fractional rotation of the rocker arm operates toggle systems 85 each of which includes a link 86 pivotally connected to the lower end of the rocker arm. This link is pivotally connected at 87 to a second link 88. The pivot 87 is also a connection with the upper end of a toggle lever 90 which is pivotally mounted at its lower end on a base 91. The link 88 of one toggle system is coupled at its upper end to the frame extension 42, and the corresponding link 88 of the parallel toggle system is coupled to a frame extension 93 rigidly projecting from the gearbox 33.

Figure 4:
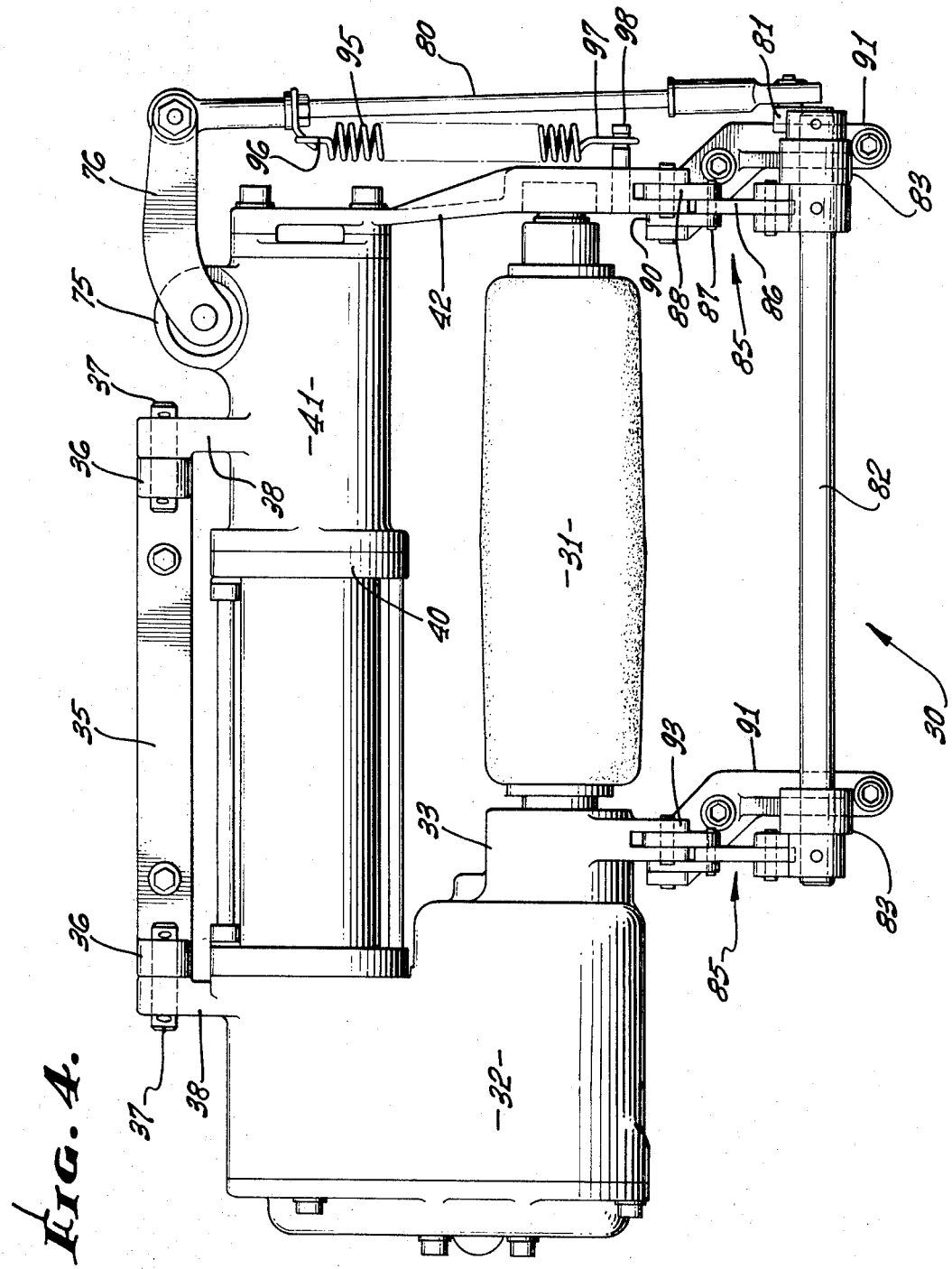
FIG. 4 is a top plan view of the power roller assembly taken on the line 4-4 of FIG. 2.
Figure 6:
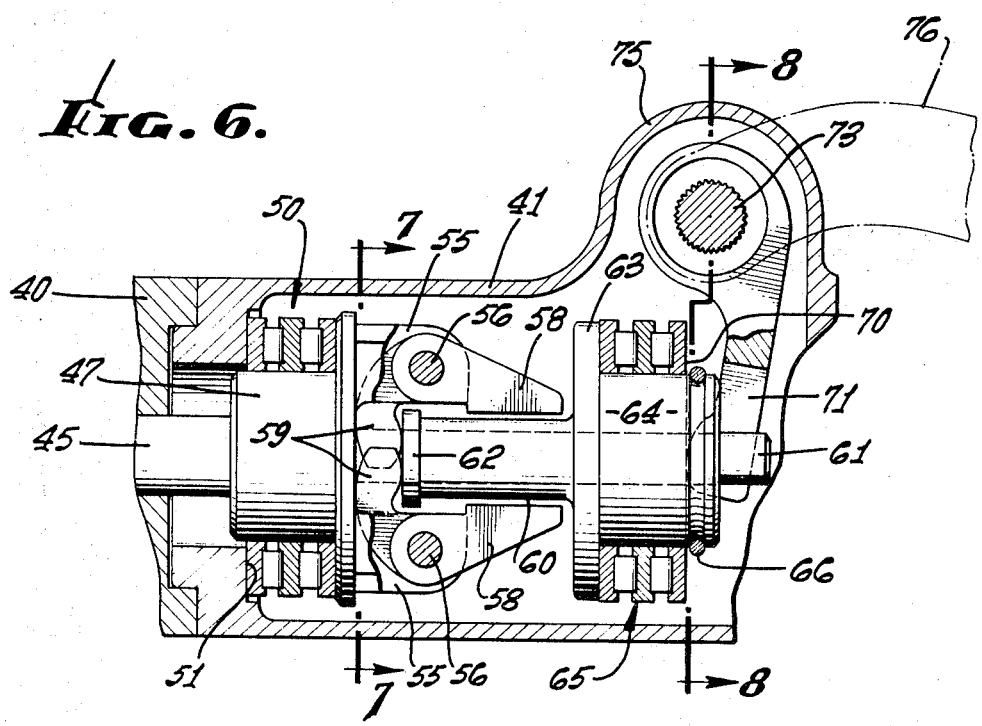
FIG. 6 is a view similar to FIG. 5 showing the flyweight at rest.
Figure 7:
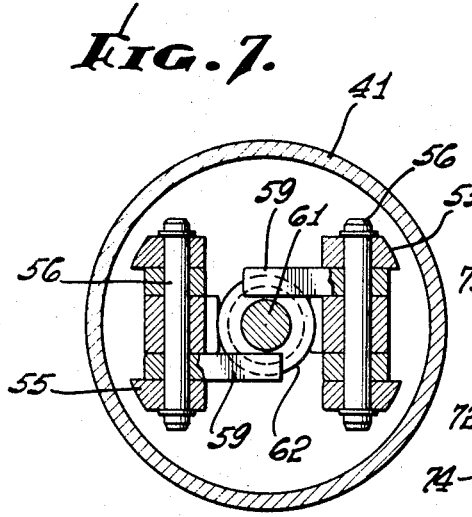
FIG. 7 is a section taken on the line 7-7 of FIG. 6.
Figure 8:
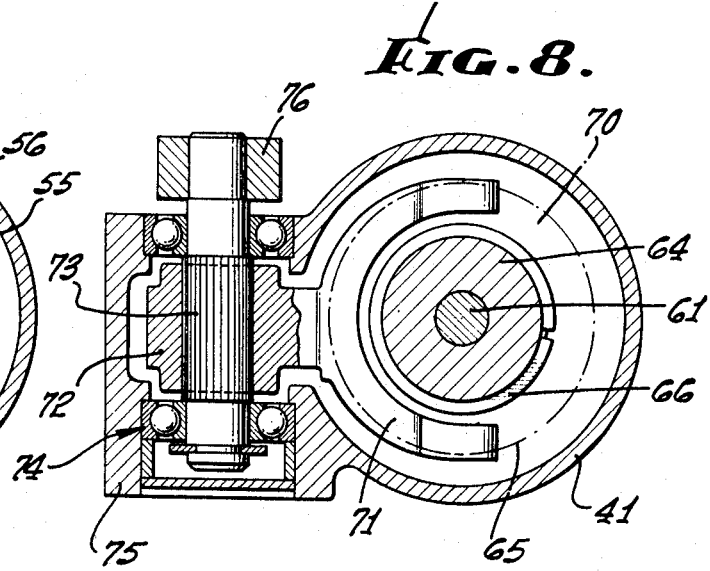
FIG. 8 is a section taken on the line 8-8 of FIG. 6.

A coil spring 95 mounted at one end 96 on the rod 80, and at its other end 97 on a stud 98 biases the lever 76 in a clockwise direction as viewed in FIG. 4. When the motor is not operating, the spring serves to retain the rod 80, the shaft 82, and the toggle systems in the positions illustrated in FIGS. 3 and 6, with the drive roller in its lower, inactive position.

When the motor is running, centrifugal thrust of the flyweights, through the cooperating mechanism described, overcomes the resistance of the spring 95, forces the toggle systems into the positions illustrated in FIG. 2, with the drive roller in its elevated, traction position.

The speed of the motor governs the degree of elevation of the drive roller, as well as the magnitude of the upward thrust of the roller against a cargo load, and the relationship between motor speed and the roller elevating system should be such as to insure adequate traction at all times. The design of parts should be such that the roller will rise above the plane at which it ordinarily gains traction with the bottom of the cargo load, so that it will follow any irregularities in the bottom of such load. Moreover, if the load should start to run away for any reason, the increased speed of the motor will increase the thrust of the roller against the load, and the system will then act as a brake to keep the movement of the load under control.

Although I have herein shown and described my invention in what I have conceived to be the most practical and preferred embodiment, it is recognized that departures may be made therefrom within the scope of my invention.

I claim:

1. A power roller mechanism for propelling movable objects along a supporting surface comprising: a drive roller, mounting means carrying said roller adapted selectively to dispose the roller in a lowered position out of contact with the object or in an elevated position in traction traction with the object, a source of rotary power, means transmitting rotary motion from said power source to the roller to drive the same, and centrifugal thrust means operated by said power source coacting with said mounting means to shift said roller from the lowered position to the elevated position.

2. A power roller mechanism as defined in claim 1, in which the centrifugal thrust means operated by the power source to shift the roller from the lowered position to the elevated position embodies a flyweight responsive to rotational speed, and means coupling the flyweight with the mounting means.

3. A power roller mechanism as defined in claim 2 in which the source of rotary power is a motor, a shaft extension provides a takeoff from the motor, the flyweight has a drive connection with the shaft extension, a rocker device and a toggle mechanism are interposed between the flyweight and the mounting means, and means are included to transmit centrifugal thrust of the flyweight by linear motion to actuate the rocker device.

4. A power roller mechanism as defined in claim 3 in which the flyweight includes a yoke keyed to the shaft extension, a pair of weights pivotally mounted on the yoke, and the means to transmit centrifugal thrust are arms extending from the weights.

5. A power roller mechanism as defined in claim 4 in which the mechanism interposed between the flyweight and the mounting means includes a thrust sleeve adapted to shift the rocker device.

6. A power roller mechanism as defined in claim 5 in which the rocker device includes an arm engageable by the thrust sleeve, and a lever rigidly coupled to the arm.

7. A power roller mechanism as defined in claim 6 in which a rod interconnects the lever and the toggle mechanism.

8. A power roller mechanism as defined in claim 7 in which the toggle mechanism includes duplicate toggle assemblies, one at each end region of the roller, and a shaft interconnects the toggle assemblies for simultaneous actuation.